United States Patent Office 3,023,214
Patented Feb. 27, 1962

---

3,023,214
3'-HYDROXYQUINOPHTHALONE-5-CARBOXYLIC ACID AND DERIVATIVES THEREOF
John William Richter, Wilmington, Del., assignor to E. I. du Pont de Nemours and Company, Wilmington, Del., a corporation of Delaware
No Drawing. Filed June 30, 1960, Ser. No. 39,757
9 Claims. (Cl. 260—287)

This invention deals with novel organic compounds which are useful as intermediates for quinophthalone dyes. More particularly, this invention deals with 3'-hydroxyquinophthalone-5-carboxylic acids of the general formula

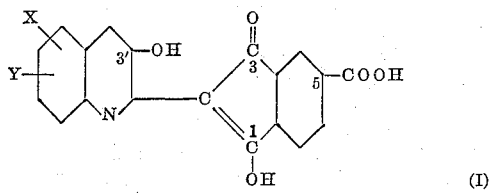

their salts and carbonyl halide derivatives, wherein X represents a member of the group consisting of H, Cl, Br, $CH_3$, and $C_6H_5$ (phenyl); Y represents H, Cl, Br or $CH_3$; and X and Y jointly may represent the benzo configuration

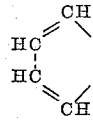

I have found that compounds of the above group are useful as intermediates for new light-fast, hydrolytically-stable, yellow dyes for multi-fiber use, as more fully described in my copending applications of even date herewith, Serial Nos. 39,755 and 39,756. I have further found that the carboxylic acids (and salts thereof) of the above general formula are useful directly as dyes for wool, nylon, paper and similar fibers.

The novel carboxylic acids of the above general formula are prepared, according to this invention, by reacting trimellitic acid or its anhydride, in an inert organic solvent such as trichlorobenzene or o-dichlorobenzene and at a temperature of 165° to 200° C., with a 3-hydroxy-2-methyl-quinoline-4-carboxylic acid of the formula

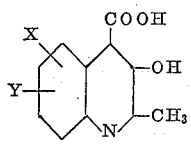

wherein X and Y have the same significance as above, and recovering the reaction product. The 4-COOH group of the initial quinoline compound is eliminated during the reaction, and the product has the general formula I above set forth.

Salts of said product are obtained conveniently by neutralization with aqueous alkalis, for instance, sodium carbonate, potassium carbonate or ammonium hydroxide.

Treatment with thionyl chloride or bromide, in per se known fashion, converts the carboxylic acid into the corresponding carbonyl halide. These carbonyl halides are also novel compounds and serve as intermediates for the preparation of the desired esters and amides, by reaction with correspondingly selected alcohols or amines.

Without limiting this invention, the following examples are given to illustrate my preferred mode of operation. Parts mentioned are by weight.

Example 1

A mixture of 22 parts of 3-hydroxy-2-methyl-4-quinolinecarboxylic acid, 29 parts of trimellitic acid, and 90 parts of trichlorobenzene is agitated and heated in the range of 180° to 200° C. for 1.5 to 2 hours. The mixture is stirred with 400 parts of 2 N sodium hydroxide, treated with an activated carbon and a diatomaceous earth filter aid, and clarified. The water layer is drawn off and acidified with 100 parts of 8 N acetic acid. The yellow-brown precipitate is collected on a filter, washed with water and dried. The 3'-hydroxyquinophthalone-5-carboxylic acid thus obtained melts at 385° to 390° C. and is represented by the following formula:

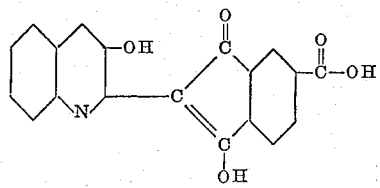

The product may be purified by dissolving it in 2,000 parts of 1.0 M aqueous sodium carbonate at the boil and filtering hot. To the warm filtrate is added 700 parts of a 20% sodium chloride solution. After cooling to room temperature, the yellow sodium salt of 3'-hydroxyquinophthalone-5-carboxylic acid is collected on a filter and dried.

This product dyes wool and nylon in yellow shades from a hot, neutral aqueous dyebath. When an aqueous solution of this dye is added to a neutral slurry of paper pulp at room temperature the paper is dyed a yellow shade.

The free acid prepared in this example and its salts are also useful as intermediates in the preparation of the basic yellow dyes which are disclosed in copending application Serial No. 39,756, for dyeing acid-modified acrylic and polyester fibers.

When 3'-hydroxyquinophthalone-5-carboxylic acid is dissolved in dilute aqueous $K_2CO_3$ at the boil, filtered hot, cooled and salted with KCl, the potassium salt of the acid is obtained. The ammonium salt is prepared in similar manner, when the free acid is dissolved in hot dilute ammonium hydroxide and subsequently salted out with ammonium chloride.

Example 2

A mixture of 21 parts of trimellitic acid, 20 parts of 3-hydroxy-2-methyl-4-quinolinecarboxylic acid and 200 parts of o-dichlorobenzene is heated at 170° C. for 7 hours. The mixture is cooled to 80° C. and 1000 parts of 0.5 M sodium carbonate are added. The slurry is heated to 90° C. and filtered hot. The o-dichlorobenzene layer is separated from the warm mixture. The water layer is heated to 100° C. and steam is passed in to distill out any remaining o-dichlorobenzene. Then 100 parts of sodium chloride are added to the aqueous mixture. After cooling the suspension to room temperature, the yellow precipitate is collected on a filter and washed with a little water. The dried product, which is the sodium salt of 3'-hydroxyquinophthalone-5-carboxylic acid, is essentially the same as that obtained in Example 1.

Example 3

A mixture of 2.1 parts of trimellitic acid, 3.6 parts of 6,8-dibromo-3-hydroxy-2-methyl-4 - quinoline - carboxylic acid (obtained from 5,7-dibromoisatin and chloroacetone in the presence of calcium hydroxide in known manner) and 25 parts of o-dichlorobenzene is heated at 165° to 170° C. for 10 hours. After cooling to 10° C., the mixture is diluted with 40 parts of cold methanol. The yellow precipitate is collected on a filter, and washed with a little methanol. This dye, 6',8'-dibromo-3'-hydroxyquinophthalone-5-carboxylic acid, when dissolved in water containing some sodium carbonate, has good substantivity for paper pulp.

*Example 4*

A mixture of 27 parts 6,8-dichloro-3-hydroxy-2-methyl-4-quinolinecarboxylic acid (obtained in a known manner from 5,7-dichloroisatin and chloroacetone; see for instance French Patent No. 784,365), and 18 parts of trimellitic anhydride in 80 parts of o-dichlorobenzene is heated at 165° to 170° C. for 10 hours while removing water by distillation. The mixture is cooled to 15° C. and diluted with 100 parts of methanol. The yellow precipitate is collected on a filter and washed with methanol. The product, 6',8'-dichloro-3'-hydroxyquinophthalone-5-carboxylic acid, is dissolved in 500 parts of hot 0.5 M sodium carbonate and filtered hot. To the filtrate are added 300 parts of a 20% sodium chloride solution. The yellow product is collected on a funnel, washed with a little cold water, and then dried. A dark yellow powder is obtained which dyes wool and nylon in bright yellow shades.

*Example 5*

A slurry of 19 parts of 3-hydroxy-2-methyl-5,6-benzoquinoline-4-carboxylic acid (made from 4,5-benzoisatin and chloroacetone in known manner), 20 parts of trimellitic anhydride, and 100 parts of trichlorobenzene is stirred at 180° to 185° C. for 5 hours, while allowing water to distill out of the reaction mixture. After cooling to 10° C., the mixture is diluted with 100 parts of cold methanol. The yellow precipitate is collected on a funnel and washed with methanol. The resulting dye, 3'-hydroxy-5',6'-benzoquinophthalone-5-carboxylic acid has the following structure

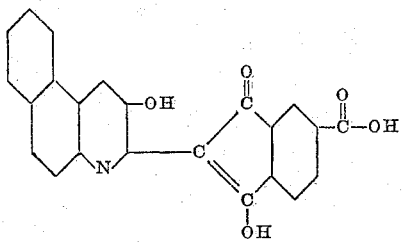

*Example 6*

A mixture of 20 parts of 7-chloro-3-hydroxy-2,8-dimethyl-4-quinolinecarboxylic acid (obtained from 6-chloro-7-methylisatin and chloroacetone in a known manner), 15 parts of trimellitic anhydride, and 60 parts of o-dichlorobenzene is heated at 165° to 170° C. for 10 hours. The mixture is cooled and diluted with 60 parts of cold methanol. The yellow precipitate of 7'-chloro-3'-hydroxy-8'-methylquinophthalone-5-carboxylic acid is collected on a filter.

When an equivalent amount of 6-chloro-3-hydroxy-2-methyl-4-quinolinecarboxylic acid or 3-hydroxy-2-methyl-6-phenyl-4-quinolinecarboxylic acid (French Patent No. 784,365) is substituted in this example in place of 7-chloro-3-hydroxy-2,8-dimethyl-4-quinoline-carboxylic acid, the corresponding yellow dyes are obtained which are soluble in hot, aqueous sodium carbonate solutions. These products dye nylon and wool in bright yellow shades. They also dye paper in yellow shades. The products are also useful intermediates for the preparation of basic dyes as disclosed in my copending application Serial No. 39,756, of even date herewith.

*Example 7*

To a slurry of 25 parts of 3'-hydroxyquinophthalone-5-carboxylic acid (from Example 1 above) in 100 parts of dry nitrobenzene are added 16.6 parts of thionyl chloride at 40° to 45° C. The mixture is heated to 90° C. to 95° C. slowly and agitated at this temperature for 2.5 hours. After cooling to 40° C. 100 parts of benzene are added. The mixture is cooled to 10° C., the 3'-hydroxyquinophthalone-5-carbonyl chloride is filtered off, washed with cold benzene and dried. The acid chloride is obtained in excellent yield. When an equivalent amount of thionyl bromide is substituted for thionyl chloride in this example, 3'-hydroxyquinophthalone-5-carbonyl bromide is obtained.

In a similar manner the quinophthalonecarboxylic acids obtained in Examples 3, 4, 5 and 6 above may be converted into the corresponding carbonyl chlorides or carbonyl bromides.

The carbonyl chlorides obtained as above are readily convertible into esters or amides which are useful as disperse dyes for polyester fibers and acid-modified polyester fibers and are described more fully and claimed in my copending application Serial No. 39,755 of even date herewith.

The novel carbonyl halides of this example are also readily convertible into cationic dyes, which are more fully described and claimed in my copending application Serial No. 39,756, of even date herewith.

I am aware of U.S.P. 2,592,370 which describes and claims quinophthalones of analogous structure except that they contain two COOH groups in the phthalone ring. My novel compounds of this invention, however, possess several important advantages over said dicarboxylic compounds. Thus, my novel compounds are obtainable in greater purity, without complications and by-products, than the dicarboxylic acids; the resulting quinophthalones react more neatly with thionyl halides to produce the corresponding carbonyl halides; and cationic dyes prepared from the monocarbonyl halides thus obtained (according to my copending application Serial No. 39,756) give considerably stronger dyeings on acid-modified synthetic fibers than the analogous cationic dyes prepared from the corresponding dicarbonyl halides.

Other adaptations of my novel compounds and variations in the details of preparing the same will be readily apparent to those skilled in the art.

I claim as my invention:

1. A compound of the formula

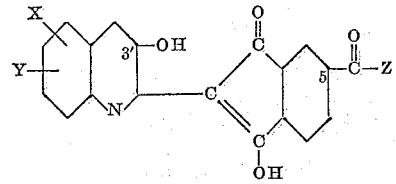

wherein X and Y represent members of the group consisting of H, Cl, Br, $CH_3$ and phenyl and when taken together form the benzo configuration

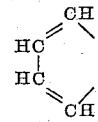

while Z stands for a member of the group consisting of Cl, Br, OH, ONa, OK and $ONH_4$.

2. 3'-hydroxyquinophthalone-5-carboxylic acid.
3. Alkali-metal salts of the acid defined in claim 2.
4. Ammonium salts of the acid defined in claim 2.
5. 6'-chloro-3'-hydroxyquinophthalone-5-carboxylic acid.
6. Alkali-metal salts of the acid defined in claim 5.
7. Ammonium salts of the acid defined in claim 5.
8. 3'-hydroxyquinophthalone-5-carbonyl chloride.
9. 6'-chloro-3-hydroxyquinophthalone-5-carbonyl chloride.

References Cited in the file of this patent

UNITED STATES PATENTS

| | | |
|---|---|---|
| 2,592,370 | Zwilgmeyer | Apr. 8, 1952 |
| 2,795,582 | Bauer et al. | June 11, 1957 |
| 2,818,409 | Zwilgmeyer | Dec. 31, 1957 |
| 2,828,311 | Gifford | Mar. 25, 1958 |